United States Patent
Jain et al.

(10) Patent No.: US 10,810,647 B2
(45) Date of Patent: Oct. 20, 2020

(54) HYBRID VIRTUAL AND PHYSICAL JEWELRY SHOPPING EXPERIENCE

(71) Applicant: International Business Machines Corporation, Armonk, NY (US)

(72) Inventors: Mohit Jain, Dhanbad (IN); Pratyush Kumar, Chennai (IN); Megha Nawhal, Bangalore (IN); Ashok Pon Kumar Sree Prakash, Bangalore (IN); Anshul Bhavesh Shah, Vadodara (IN); Gyanendra Sharma, Troy, NY (US); Amith Singhee, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 398 days.

(21) Appl. No.: 15/618,807

(22) Filed: Jun. 9, 2017

(65) Prior Publication Data
US 2018/0357702 A1    Dec. 13, 2018

(51) Int. Cl.
*G06Q 30/00*    (2012.01)
*G06Q 30/06*    (2012.01)
(Continued)

(52) U.S. Cl.
CPC ..... *G06Q 30/0621* (2013.01); *G06Q 30/0631* (2013.01); *G06Q 30/0643* (2013.01); *G06T 11/00* (2013.01); *G06T 19/006* (2013.01)

(58) Field of Classification Search
None
See application file for complete search history.

(56) References Cited

U.S. PATENT DOCUMENTS 8,908,928 B1 *   12/2014   Hansen .............. G06K 9/00362
                                                          382/111
9,418,378 B2     8/2016   Staicut et al.
(Continued)

FOREIGN PATENT DOCUMENTS

CN          103544636 A          1/2014

OTHER PUBLICATIONS

Gehring, Sven, Mobile Product Customization, Apr. 2010, CHI '10 Extended Abstracts on Human Factors in Computing Systems, pp. 3463-3468 (Year: 2010).*
(Continued)

*Primary Examiner* — Michael Misiaszek
*Assistant Examiner* — Timothy J Kang
(74) *Attorney, Agent, or Firm* — Ference & Associates LLC

(57) ABSTRACT

One embodiment provides a method, including: obtaining, at an information handling device, an image of a person; determining physical characteristics of the person by analyzing the image; receiving an image of at least one selected piece of jewelry, the selected jewelry having a given jewelry profile, wherein the jewelry profile describes features and construction of the selected piece of jewelry; overlaying the image of the at least one selected piece of jewelry onto an image of the person, wherein the overlaying comprises analyzing resizing the image of the at least one selected piece of jewelry to match the physical characteristics of the person, in view of the jewelry profile of the at least one selected piece of jewelry; and providing, on a display of the information handling device, an output image of the image of the person comprising the overlaid image of the at least one piece of jewelry.

20 Claims, 4 Drawing Sheets

(51) Int. Cl.
*G06T 19/00* (2011.01)
*G06T 11/00* (2006.01)

(56) References Cited

U.S. PATENT DOCUMENTS

| | | | |
|---|---|---|---|
| 2009/0018910 A1 | 1/2009 | Jung et al. | |
| 2012/0040314 A1* | 2/2012 | Rubino, Jr. | G06Q 30/02 |
| | | | 434/81 |
| 2014/0052563 A1* | 2/2014 | Watkins | G06Q 30/0621 |
| | | | 705/26.5 |
| 2015/0055085 A1* | 2/2015 | Fonte | H04N 5/23219 |
| | | | 351/178 |
| 2015/0363812 A1* | 12/2015 | McMillan | G06Q 30/0225 |
| | | | 705/14.26 |
| 2016/0117763 A1 | 4/2016 | Cypher et al. | |

OTHER PUBLICATIONS

Chow Sang Sang, "Magic Mirror on the Wall", Accessed on Mar. 2, 2017, 4 pages, Internet Archive Wayback Machine.
Unknown, "UniQlo's Magic Mirror", Apr. 1, 2013, Accessed on Mar. 2, 2017, 1 page, Innovation Article.
Unknown, "Virtual Try-On", Accessed on Mar. 2, 2017, 4 pages, Internet Archive Wayback Machine.

* cited by examiner

HYBRID VIRTUAL AND PHYSICAL JEWELRY SHOPPING EXPERIENCE

BACKGROUND

Many people like to wear jewelry (e.g., bracelets, necklaces, rings, earrings, maangtika, mangalsutra, etc.). The jewelry may be bought and worn for many different reasons and occasions. For example, a person may wear jewelry for personal reasons (e.g., the person likes jewelry, the person wears the jewelry to accent a particular feature, etc.), cultural reasons (e.g., the jewelry piece is expected in the culture, the jewelry piece represents a particular status in the culture, etc.), religious reasons, and the like. Jewelry may be bought and sold in many different environments, for example, in physical stores, in virtual stores, and the like. The stores, both virtual and physical, may provide many different selections and designs for different jewelry types.

BRIEF SUMMARY

In summary, one aspect of the invention provides a method, comprising: utilizing at least one processor to execute computer code that performs the steps of: obtaining, at an information handling device, an image of a person; determining physical characteristics of the person by analyzing the image; receiving an image of at least one selected piece of jewelry, the selected jewelry having a given jewelry profile, wherein the jewelry profile describes features and construction of the selected piece of jewelry; overlaying the image of the at least one selected piece of jewelry onto an image of the person, wherein the overlaying comprises analyzing resizing the image of the at least one selected piece of jewelry to match the physical characteristics of the person, in view of the jewelry profile of the at least one selected piece of jewelry; and providing, on a display of the information handling device, an output image of the image of the person comprising the overlaid image of the at least one piece of jewelry.

Another aspect of the invention provides an apparatus, comprising: at least one processor; and a computer readable storage medium having computer readable program code embodied therewith and executable by the at least one processor, the computer readable program code comprising: computer readable program code that obtains, at an information handling device, an image of a person; computer readable program code that determines physical characteristics of the person by analyzing the image; computer readable program code that receives an image of at least one selected piece of jewelry, the selected jewelry having a given jewelry profile, wherein the jewelry profile describes features and construction of the selected piece of jewelry; computer readable program code that overlays the image of the at least one selected piece of jewelry onto an image of the person, wherein the overlaying comprises analyzing resizing the image of the at least one selected piece of jewelry to match the physical characteristics of the person, in view of the jewelry profile of the at least one selected piece of jewelry; and computer readable program code that provides, on a display of the information handling device, an output image of the image of the person comprising the overlaid image of the at least one piece of jewelry.

An additional aspect of the invention provides a computer program product, comprising: a computer readable storage medium having computer readable program code embodied therewith, the computer readable program code executable by a processor and comprising: computer readable program code that obtains, at an information handling device, an image of a person; computer readable program code that determines physical characteristics of the person by analyzing the image; computer readable program code that receives an image of at least one selected piece of jewelry, the selected jewelry having a given jewelry profile, wherein the jewelry profile describes features and construction of the selected piece of jewelry; computer readable program code that overlays the image of the at least one selected piece of jewelry onto an image of the person, wherein the overlaying comprises analyzing resizing the image of the at least one selected piece of jewelry to match the physical characteristics of the person, in view of the jewelry profile of the at least one selected piece of jewelry; and computer readable program code that provides, on a display of the information handling device, an output image of the image of the person comprising the overlaid image of the at least one piece of jewelry.

A further aspect of the invention provides a method, comprising: utilizing at least one processor to execute computer code that performs the steps of: receiving at least one image of a person; analyzing the at least one image to identify body features of the person; receiving an image of a jewelry selection and identifying characteristics of the jewelry selection; superimposing the image of the jewelry selection on an image of the person, wherein the superimposing comprises using the characteristics of the jewelry selection to modify the image of the jewelry selection to match the identified body features of the person to create a natural appearance of the jewelry selection on the person; and presenting, on a display device, the image of the person having the superimposed image of the jewelry selection.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
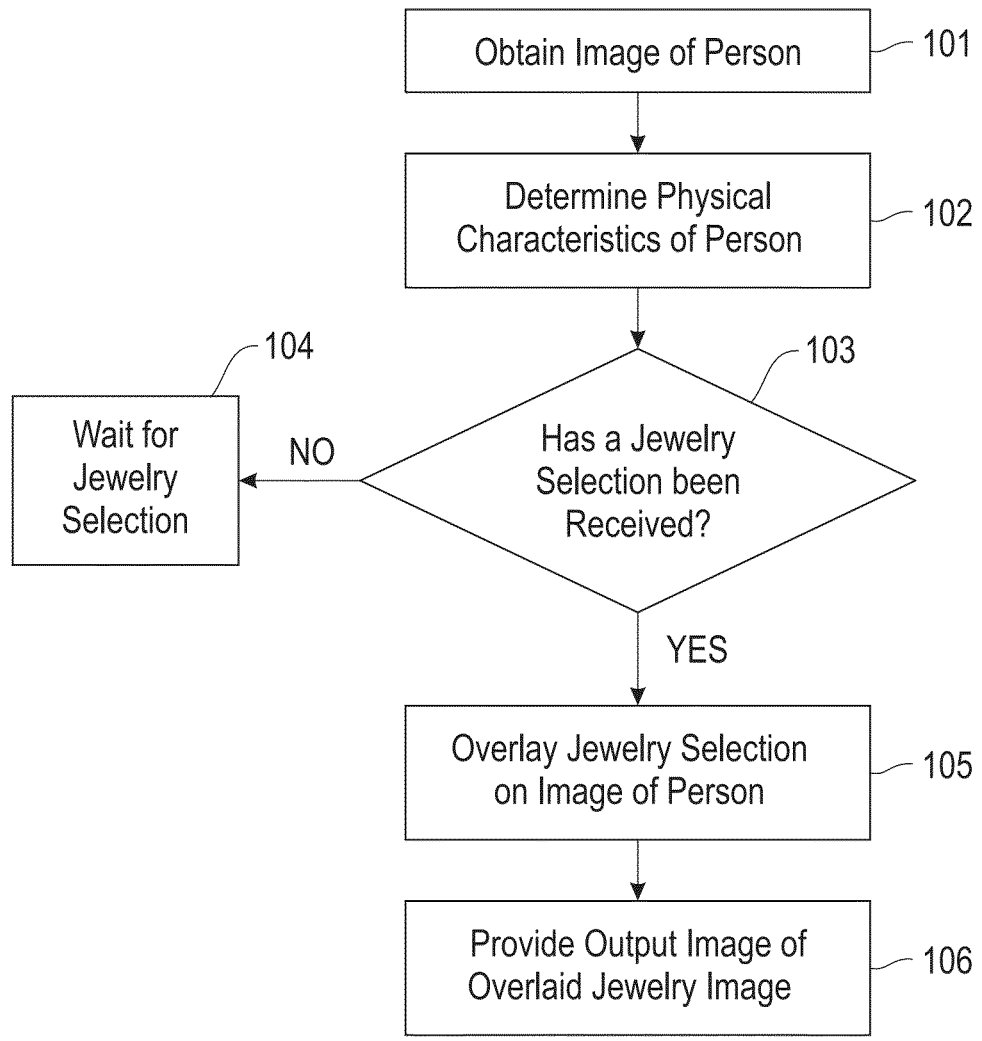
FIG. 1 illustrates a method of providing a hybrid virtual store/physical store shopping environment.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Traditionally, people shop for and/or buy jewelry in brick-and-mortar or physical stores. The physical store provides the buyer with many different advantages that may be attained in a virtual online store. For example, due to the high cost of some jewelry, the person may want to see how the jewelry will look on his or her person before committing to the purchase of the piece. Therefore, the physical store provides a buyer an opportunity to see the piece of jewelry and try it on before purchasing the piece. Accordingly, even if the person buys the jewelry online, the person may first go to a store and find something similar to try on in order to determine if he or she will like the jewelry. Additionally, the physical store provides jewelers the ability to make recommendations based upon features a person may like. Also, the jewelers may be able to create a custom piece that is not possible with a virtual store.

On the other hand, the virtual store provides some advantages over physical stores. For example, the virtual store may provide a greater selection than a physical store. As another example, in a physical store a person may have to try on many different pieces of jewelry which may become tiring and tedious. Using the virtual store the person can browse through many different pages of jewelry, rather than trying them all on. However, the virtual store only provides a picture of the piece of jewelry. At best, the virtual store may provide a picture of the piece on a mannequin or jewelry stand which may give a shopper an idea of the size of the piece. However, the virtual store does not provide an accurate image or representation of how the piece will actually look on the buyer.

Accordingly, an embodiment provides a system and method for providing a hybrid jewelry shopping experience by combining aspects of a virtual store and a physical store. The system may obtain an image of a person. For example, as a person walks around a physical store, the system may capture an image of the person. The image may be an image of only the person, a group of people, the person wearing jewelry, and the like. The system may analyze the image of the person and identify particular physical features or characteristics of the person. Physical features or characteristics may include the shape of a feature (e.g., oval face, square jaw, small nose, etc.), the location and spacing of a feature with respect to another feature (e.g., long neck, distance between the nose and eyes, length and size of an arm, etc.), skin tone, hair color, and the like. The system may use additional information included in the image to assist in identifying the physical features or characteristics. For example, if the image includes a piece of jewelry, the system may use known features of the jewelry to assist in identifying some of the physical features or characteristics of the person.

A person may then select a piece of jewelry. The selection of this jewelry may include a selection of a physical piece of jewelry or a virtual piece of jewelry. For example, a person may access a kiosk that includes images of many different pieces of jewelry. As another example, the person may point out a particular piece of physical jewelry in the store and the system may either take an image or access a previously captured image of the piece. The selection may also include a custom piece. For example, a person may identify different features from different pieces and the system may, using the jewelry profile of the features, generate an image of the custom piece.

The system may then overlay the selected jewelry image onto an image of the person. The selected jewelry piece includes a jewelry profile which may be previously identified or determined by the system upon receipt of the image of the jewelry. Each piece of jewelry has a known jewelry profile which describes or identifies the features and construction of the piece of jewelry. For example, the jewelry profile may identify the type of jewelry (e.g., necklace, bracelet, ring, earrings, etc.), the features of the jewelry (e.g., stones, metal type, number of features, type of feature, etc.), the location of features with respect to other features, the construction of the jewelry (e.g., knot types, closure type, how and where a feature is connected to another feature, chain type, setting type, etc.). In other words, the jewelry profile provides information needed to specifically identify a piece of jewelry and how it is constructed. Using the jewelry profile and the previously identified physical characteristics the system may overlay the selected jewelry piece onto an image of a person in a manner which provides a more accurate and natural image than traditional methods. The system may then provide this output image to the user.

Such a system provides a technical improvement to current jewelry shopping systems and experiences. Traditional techniques require that a person go in-store and is then limited to only the selection provided in-store, or online which then limits the ability of a person to see how the piece will actually look on. The systems and methods as described herein provide a technique for hybridizing the in-store and virtual store shopping experiences. More particularly, the systems and methods as described herein take the features from the in-store shopping experience and the virtual shopping experience that are desired by users and combine them to create a hybrid shopping experience. In doing so the system as described herein provides a single system to visually preview in-store or custom pieces of jewelry on the person, provide recommendations for either custom pieces or in-store pieces, provide a collaborative environment for multiple users, some who may not be in-store, and the like. All of these features are not possible with conventional systems.

Referring now to FIG. 1, at 101 the system may obtain one or more images of a user. Obtaining the one or more images may include receiving, capturing, or otherwise procuring the image(s). For example, the system may extract a still image or frame from a video. As a person walks around a store, different video cameras or other image capture devices (e.g., video recorder, camera, gaming system, etc.), may capture images of the person. The image may not only include an image of the person, for example, the person may be wearing one or more pieces of jewelry in the image, the image may include one or more people, and the like. The one or more images may include different angles of the person (e.g., side profile, front profile, focused on a particular features, etc.), may be taken at different times (e.g., different days, minutes apart, etc.), may be obtained from different sources (e.g., one image captured in-store and one image uploaded, etc.), and the like.

The system may analyze the image to determine physical characteristics of the person in the image at 102. Physical characteristics of a person may include feature size, shape, location, location and/or distance with respect to other features, and the like. For example, the system may identify the size of a person's neck, the size of a person's arm, the distance between a person's eyes, the distance from a person's ear to the person's shoulder, and the like. If the one or more images include additional information, for example, if the image includes a piece of jewelry, the system may use this additional information to assist in identifying the physical characteristics of the person. As an example, if the system knows a size of a feature of the jewelry, the system can use this known size to calculate other measurements with respect to the features and distances between features of the person. As another example, the system may identify the structure of a person's features based upon how the piece of jewelry lays or fits on the person. The system may not analyze each image to identify physical characteristics. For example, if one image provides no information not already identified by the system, the system may not analyze that image.

The system may include profiles for different people. Accordingly, the system may identify the particular person in the image. Identification of the person may include identifying the particular person, for example, by name, identification number, or the like, or may include identifying the person with respect to a stored person, for example, comparing the image to images within profiles, identifying a group of people having similar features, and the like. The profiles for different people may store different information about the person. For example, the profile may include information regarding the physical characteristics of the person. In such a case, the system may not analyze any new images unless the image would provide information not already known by the system. The profile may also include additional information about the person, for example, buying preferences, a buying history, a virtual shopping cart, a virtual wishlist, and the like.

Figure 2:
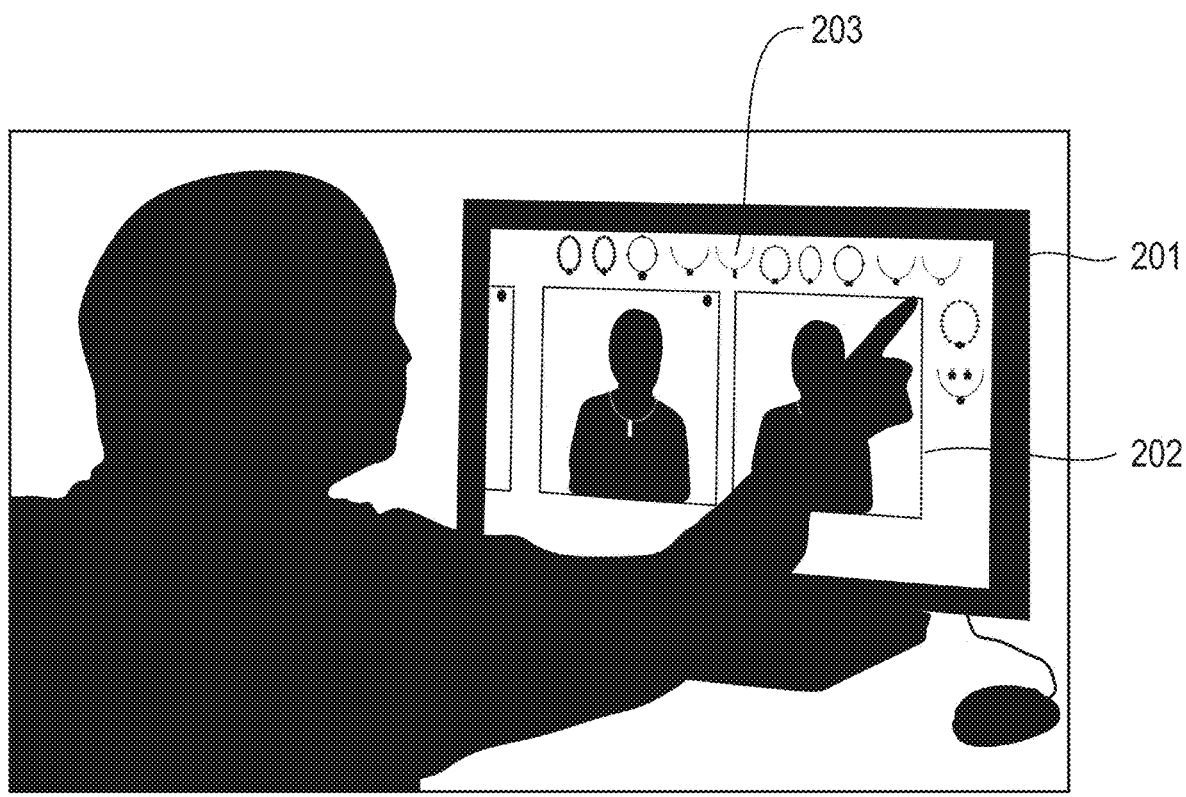
FIG. 2 illustrates an example kiosk and display screen.
Figure 3:
FIG. 3 illustrates an example custom jewelry piece recommendation.

At 103 the system may determine whether a jewelry selection has been received. The system may provide a kiosk or virtual store, for example, as shown in FIG. 2. The kiosk or virtual store may include a display 201. The display may provide an image of the user 202, which may have been previously captured or may be captured as the user accesses the kiosk, for example, to provide an up-to-date image of the user. The display may also provide images of different jewelry pieces 203, which may or may not be physically present in store. The kiosk or virtual store may be located within the physical store or may be accessible using an information handling device (e.g., personal computer, mobile phone, tablet, laptop computer, smart television, smart watch, etc.) from a different physical location other than the physical store.

Using the kiosk or virtual store, the user may make a selection of a piece of jewelry. The selection of the piece of jewelry may also be done in-store. For example, the user may not access the kiosk to select the piece, but, rather, may select a piece physically present in the store. The system may capture an image or access a previously stored image of the selected piece at the kiosk or virtual store location. When the user then accesses the kiosk, the system may present the image of the piece or pieces selected in-store rather than selected from the images stored on or accessible by the kiosk. The selected piece of jewelry includes a jewelry profile which may be previously identified or may be identified by the system in close to real-time upon selection of the image.

Each piece of jewelry may have a jewelry profile or jewelry profile. The jewelry profile may identify the features and construction of the jewelry piece. For example, the jewelry profile may identify the type or class of jewelry (e.g., necklace, bracelet, ring, earrings, etc.), the features or parts of the jewelry (e.g., stones, metal type, colors, number of features, type of feature, etc.), the location of features with respect to other features, the construction of the jewelry (e.g., knot types, closure type, how and where a feature is connected to another feature, chain type, setting type, etc.), size of features, properties of the jewelry (e.g., feature shape, stone shape, etc.), and the like. In other words, the jewelry profile provides information needed to specifically identify a piece of jewelry and how it is constructed. As an example, the jewelry profile for a necklace may identify the metal, pendant type and shape, knot construction attaching the pendant to the chain, chain type and the like.

The jewelry profile may also identify different characteristics of the components or features of the jewelry piece. For example, the jewelry profile may identify that a particular chain can hold a particular weight, can only be connected using particular knots, and the like. The jewelry profile specifies the jewelry class, different parts of the jewelry, with different properties, and possible values (e.g., square, circular, funky, religious, etc.), and the like. Additionally, the jewelry profile identifies which combination of values for different properties are allowed. For example, if a particular chain cannot hold a particular stone, the jewelry profile would identify that these two features cannot be combined. The selected piece of jewelry may include a known jewelry profile. For example, the jewelry profile for the piece of jewelry in the image may be stored in a database or other data storage location accessible to the system.

The jewelry selection may also include a custom piece. To generate an image of a custom piece, the system may parse and stitch an image together from other images. As an example, a user may identify different features from different pieces of jewelry that the user is interested in. As another example, the user may identify two pieces of jewelry in-store and then make a gesture indicating that the two pieces should be combined into a new piece. The system may then identify which pieces the person has pointed at and then determine how the two pieces can be combined into a single piece. Once the two or more pieces are identified, the system may then, using the jewelry profile, generate an image of the piece of jewelry having the selected features. As an example, a user may select a pendant from one necklace and chain from a different necklace. The system may then identify the knot or feature that is necessary for attaching the selected pendant to the selected chain. Upon making this determination, the system may generate the image of the custom piece. The system may also provide images of different custom options. For example, if more than one custom option is available using the selected features, the system may generate more than one image showing each option.

Additionally, if the user identifies a particular jewelry piece, but would like to see the piece differently, the system can generate different custom images based upon the desired "look" the user desires. For example, referring to FIG. 3, the user may identify the in-store necklace 301 as something they like. However, the user may identify that he/she would like to see the necklace with a different colored stone, in the same design, but a lighter version, and in the same design, but a shorter version. Using this input the system can generate the images of the necklace with a different colored stone 302, in the same deign, but a lighter version 303, and in the same design, but a shorter version 304.

The virtual store or kiosk may provide a multi-modal environment that can take user input of different modalities. For example, the user may select an image using a mouse or via a touch screen. The user may also provide gesture input. For example, the user may point to a particular image, feature in an image, or the like. The user may also provide voice input. For example, the user may point to a particular image and provide a voice input selecting the image. As another example, the user may provide voice input to modify the jewelry piece or image. For example, the user may say "I'd like to see it with purple stones."

If a jewelry selection has not been received, the system may wait for a jewelry selection at 104. If a jewelry selection has been received, the system may overlay the jewelry selection onto an image of the person at 105. A piece of jewelry may appear different on different people due to different physical features or characteristics of a person. For example, a particular sized stone in a ring may look larger or smaller depending on the size of a person's fingers and hands. Accordingly, the system may use the jewelry profile of the jewelry piece to identify how the selected piece of jewelry should appear on the person to provide a natural looking image of the person wearing the piece of jewelry. Accordingly, overlaying the image of the jewelry selection onto an image of the person may include analyzing the jewelry profile of the selected jewelry piece and determining how the jewelry would appear on the person based upon the identified physical characteristics of the person. The image of the person does not have to be an image of the person accessing the virtual store. Rather, the user may select an image of another person to use as the person in the image.

The system may resize or modify the image of the selected jewelry to match the physical characteristics of the person. In other words, the system may resize and modify the selected jewelry image to correspond to the physical characteristics of the person so that the selected jewelry image appears as close to what it would actually look like on the person. For example, the system may locate the pendant on a necklace on the image of the person close to where the pendant would appear if the person were actually wearing the selected jewelry. Using the jewelry profile of the selected jewelry the system can produce an overlaid image as close to natural looking and what it would actually look like as possible.

The system may also provide recommendations for the jewelry selection. The recommendation may be based upon the physical characteristics of the person. For example, the system may identify that other people having similar physical characteristics have liked a particular piece of jewelry. The system may then make a recommendation of that piece of jewelry. As another example, the system may use the physical characteristics of a person to determine what piece of jewelry or particular jewelry profile would complement those physical characteristics. If the system identifies a particular jewelry profile, the system may then identify jewelry pieces that have the identified jewelry profile for recommendation. The jewelry recommendation may also be based upon the profile of a user. For example, the recommendation may be based upon a buying history, wish list history, previously identified jewelry pieces, previously identified jewelry profile, previously identified features, and the like.

A recommendation may also include a custom piece of jewelry. The system may use the jewelry profile of multiple pieces of jewelry to create and recommend a custom piece of jewelry. For example, if a person identifies that they like particular features of different pieces of jewelry, the system may combine those features together to create a custom piece. Alternatively, the system may identify the features and generate a custom piece that has similar features. As an example, a user may identify that he/she likes a particular pendant, chain length, and detail of a necklace. The system may identify particular characteristics of those features and create a custom piece without the specifically identified features, but with features that have similar characteristics to those identified features. In other words, the system may generate a recommendation for a custom piece that is based upon captured or previously identified preferences of the user.

At 106 the system may provide an output image of the jewelry selection overlaid onto the image of the person. This output image may provide an image of the user wearing the selected jewelry piece. Since the jewelry is overlaid onto the image of the person using the jewelry profile, the resulting output image provides a natural looking image of the person wearing the jewelry piece. Thus, the user is provided a technique to see how the piece of jewelry will look on without actually having to try on or wear the piece of jewelry. The system may also save this image or the image of the jewelry selection to a user profile, for example, for later access.

The system and methods as described herein can also provide a collaborative shopping environment. For example, using the systems and methods herein more than one person in different physical locations can access the virtual store to see what the other users are seeing. As an example, one person may be in the jewelry store, one person may be at home, and another person may be at a coffee shop. Each person can access the virtual store using different devices. For example, the in-store person may access the virtual store through the store kiosk, the person at home may access the virtual store on a personal computer, and the person at the coffee shop may access the virtual store on a mobile device. Each virtual store session may have a unique identifier, for example, hyperlink, user name/password, session identification, and the like, so that each person can access the same virtual store. Thus, all the people of the identified group will access the same virtual store session rather than accidentally accessing a virtual store session of a different group.

As each person accesses the virtual store, each person may see what everyone else is seeing. For example, the in-store person may make a jewelry selection and the system may generate the output image. The system may then transmit this image to an application which is accessed by the other people so they can see the same output image. Since all the people can access the same virtual store, the jewelry selection may be selected by any of the people accessing the same virtual store. For example, the person at home may make the jewelry selection instead of the in-store person. Additionally, the image of the person used for showcasing the jewelry can be an image of any of the people accessing the virtual store, or may be an image of another user. For example, one of the user's may upload an image of another person to be used for the image of the person for overlaying the jewelry. As an example, three children may be buying jewelry for their mom. One of the children may upload or select an image, for example, from a profile, of mom. As the jewelry selections are made, the selected jewelry may be overlaid on this image of mom.

Figure 4:
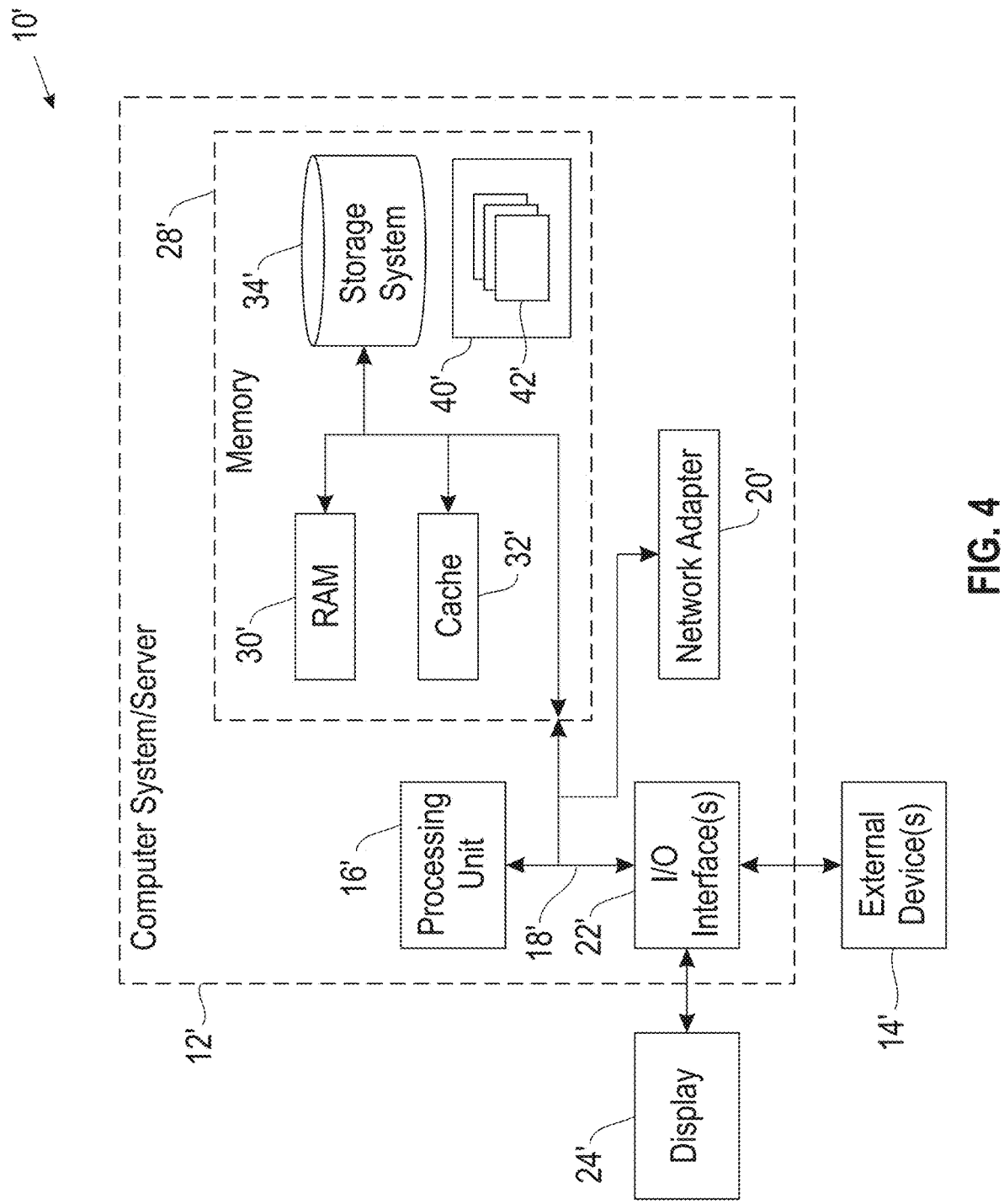
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
obtaining, at a virtual store displayed on an information handling device, an image of a person, wherein the image is obtained from an image capture device separate from the information handling device;
determining physical characteristics of the person by analyzing the image;
receiving an image of at least one selected piece of jewelry, the selected jewelry having a given jewelry profile, wherein the jewelry profile describes features and construction of the selected piece of jewelry;
from the image of the at least one selected piece of jewelry and based upon jewelry features identified by the person, generating a custom jewelry piece image, wherein the generating comprises (i) extracting the jewelry features identified by the person by parsing the image of the at least one selected piece of jewelry and other images of jewelry pieces, wherein at least one of the jewelry features identified by the person is extracted from the image of the at least one selected piece of jewelry and at least another of the jewelry features identified by the person is extracted from one of the other images of jewelry pieces, (ii) determining at least one jewelry connection feature for combining the extracted jewelry features, and (iii) stitching portions of the parsed images corresponding to the extracted jewelry features and the determined at least one jewelry connection feature together to form the custom jewelry piece image;

overlaying the custom jewelry image onto an image of the person, wherein the overlaying comprises resizing the custom jewelry piece image of the to match the physical characteristics of the person, in view of the jewelry profile of the custom jewelry piece; and providing, at the virtual store and on a display of the information handling device, an output image of the image of the person comprising the overlaid custom jewelry image.

2. The method of claim 1, wherein the custom jewelry image is generated via:
receiving images of at least two other pieces of jewelry, each having a jewelry profile;
wherein the jewelry features identified by the person are identified via receiving an indication of features of the at least two other pieces of jewelry to be used for making the custom piece of jewelry; and
combining, based upon the jewelry profiles of the at least two other pieces of jewelry, the indicated features of the at least two other pieces of jewelry into a single image of the custom piece of jewelry.

3. The method of claim 1, comprising providing a recommendation, using a jewelry profile, for a piece of custom jewelry based upon captured preferences of the person, wherein the captured preferences identify features of jewelry the person prefers.

4. The method of claim 1, comprising providing a recommendation for a piece of jewelry based upon the physical characteristics of the person and historical selections of the person.

5. The method of claim 1, comprising transmitting the output image to at least one other information handling device.

6. The method of claim 5, wherein the at least one other information handling device is located in a physical location other than the information handling device.

7. The method of claim 5, wherein the receiving a selection comprises receiving a selection from the at least one other information handling device.

8. The method of claim 1, comprising identifying the person and accessing a profile associated with the identified person, wherein the profile comprises preferences of the person and a buying history of the user.

9. The method of claim 1, comprising storing the at least one piece of jewelry in a profile of the person.

10. The method of claim 1, wherein the obtaining an image comprises extracting a frame from a video.

11. An apparatus, comprising:
at least one processor; and
a computer readable storage medium having computer readable program code embodied therewith and executable by the at least one processor, the computer readable program code comprising:
computer readable program code that obtains, at a virtual store displayed on an information handling device, an image of a person, wherein the image is obtained from an image capture device separate from the information handling device;
computer readable program code that determines physical characteristics of the person by analyzing the image;
computer readable program code that receives an image of at least one selected piece of jewelry, the selected jewelry having a given jewelry profile, wherein the jewelry profile describes features and construction of the selected piece of jewelry;
from the image of the at least one selected piece of jewelry and based upon jewelry features identified by the person, computer readable program code that generates a custom jewelry piece image, wherein the generating comprises (i) extracting the jewelry features identified by the person by parsing the image of the at least one selected piece of jewelry and other images of jewelry pieces, wherein at least one of the jewelry features identified by the person is extracted from the image of the at least one selected piece of jewelry and at least another of the jewelry features identified by the person is extracted from one of the other images of jewelry pieces, (ii) determining at least one jewelry connection feature for combining the extracted jewelry features, and (iii) stitching portions of the parsed images corresponding to the extracted jewelry features and the determined at least one jewelry connection feature together to form the custom jewelry piece image;
computer readable program code that overlays the custom jewelry image onto an image of the person, wherein the overlaying comprises analyzing resizing the custom jewelry piece image to match the physical characteristics of the person, in view of the jewelry profile of the custom jewelry piece; and
computer readable program code that provides, at the virtual store and on a display of the information handling device, an output image of the image of the person comprising the overlaid custom jewelry image.

12. A computer program product, comprising:
a computer readable storage medium having computer readable program code embodied therewith, the computer readable program code executable by a processor and comprising:
computer readable program code that obtains, at a virtual store displayed on an information handling device, an image of a person, wherein the image is obtained from an image capture device separate from the information handling device;
computer readable program code that determines physical characteristics of the person by analyzing the image;
computer readable program code that receives an image of at least one selected piece of jewelry, the selected jewelry having a given jewelry profile, wherein the jewelry profile describes features and construction of the selected piece of jewelry;
from the image of the at least one selected piece of jewelry and based upon jewelry features identified by the person, computer readable program code that generates a custom jewelry piece image, wherein the generating comprises (i) extracting the jewelry features identified by the person by parsing the image of the at least one selected piece of jewelry and other images of jewelry pieces, wherein at least one of the jewelry features identified by the person is extracted from the image of the at least one selected piece of jewelry and at least another of the jewelry features identified by the person is extracted from one of the other images of jewelry pieces, (ii) determining at least one jewelry connection feature for combining the extracted jewelry features, and (iii) stitching portions of the parsed images corresponding to the extracted jewelry features and the determined at least one jewelry connection feature together to form the custom jewelry piece image;

computer readable program code that overlays the custom jewelry image onto an image of the person, wherein the overlaying comprises analyzing resizing the custom jewelry piece image to match the physical characteristics of the person, in view of the jewelry profile of the custom jewelry piece; and computer readable program code that provides, at the virtual store and on a display of the information handling device, an output image of the image of the person comprising the overlaid custom jewelry image.

13. The computer program product of claim 12, wherein the custom jewelry image is generated via:

receiving images of at least two other pieces of jewelry, each having a jewelry profile;

wherein the jewelry features identified by the person are identified via receiving an indication of features of the at least two other pieces of jewelry to be used for making the custom piece of jewelry; and combining, based upon the jewelry profile of the at least two other pieces of jewelry, the indicated features of the at least two other pieces of jewelry into a single image of the custom piece of jewelry.

14. The computer program product of claim 12, comprising providing a recommendation, using a jewelry design profile, of a piece of custom jewelry based upon captured preferences of the person, wherein the captured preferences identify features of jewelry the person prefers.

15. The computer program product of claim 12, comprising providing a recommendation for a piece of jewelry based upon the physical characteristics of the person and historical selections of the person.

16. The computer program product of claim 12, comprising transmitting the output image to at least one other information handling device.

17. The computer program product of claim 16, wherein the at least one other information handling device is located in a physical location other than the information handling device.

18. The computer program product of claim 16, wherein the receiving a selection comprises receiving a selection from the at least one other information handling device.

19. The computer program product of claim 12, comprising identifying the person and accessing a profile associated with the identified person, wherein the profile comprises preferences of the person and a buying history of the user.

20. A method, comprising:

utilizing at least one processor to execute computer code that performs the steps of:

receiving at least one image of a person at a virtual store displayed on an information handling device;

analyzing the at least one image to identify body features of the person;

receiving an image of a jewelry selection and identifying characteristics of the jewelry selection;

from the image of the at least one selected piece of jewelry and based upon jewelry features identified by the person, generating a custom jewelry piece image, wherein the generating comprises (i) extracting the jewelry features identified by the person by parsing the image of the at least one selected piece of jewelry and other images of jewelry pieces, wherein at least one of the jewelry features identified by the person is extracted from the image of the at least one selected piece of jewelry and at least another of the jewelry features identified by the person is extracted from one of the other images of jewelry pieces, (ii) determining at least one jewelry connection feature for combining the extracted jewelry features, and (iii) stitching portions of the parsed images corresponding to the extracted jewelry features and the determined at least one jewelry connection feature together to form the custom jewelry piece image;

superimposing the custom jewelry image onto an image of the person, wherein the superimposing comprises using the characteristics of the jewelry selection to modify the image of the custom jewelry piece image to match the identified body features of the person to create a natural appearance of the custom jewelry piece on the person; and presenting, at the virtual store and on a display device, the image of the person having the superimposed custom jewelry image, wherein the display device is separate and different from an information handling device used to capture the at least one image.

* * * * *